Patented May 3, 1949

2,468,769

UNITED STATES PATENT OFFICE 2,468,769

ADDUCTS OF UNSATURATED ACIDS WITH CYCLIC POLYMERS OF HEXADIENES AND PROCESSES FOR THEIR PRODUCTION AND UTILIZATION

Rupert C. Morris and John L. Van Winkle, Berkeley, Calif., assignors to Shell Development Company, San Francisco, Calif., a corporation of Delaware No Drawing. Application November 9, 1944,
Serial No. 562,743

12 Claims. (Cl. 260—342.4)

This invention relates to the reaction of alpha,-beta-unsaturated-alpha,beta-dicarboxylic acids and ester-forming derivatives thereof with low molecular weight cyclic polymers of branch-chain 1,3-butadienes having in the molecule a straight chain of 5 carbon atoms. The invention relates also to the resulting dicarboxylic acids and to derivatives thereof.

The general procedure of adding maleic anhydride to unsaturated compounds of many kinds is old. It is also known that in many cases the addition products may be reacted with polyhydric alcohols forming polyesters.

We have discovered that alpha,beta-unsaturated-alpha,beta-dicarboxylic acids and ester-forming derivatives thereof can be reacted with low molecular weight polymers of branch-chain 1,3-hexadienes having in the molecule a straight chain of 5 carbon atoms. We have found that the reaction products are dicarboxylic acids or derivatives thereof having unique properties which render them of superior value in numerous applications for which they are suitable. For instance, the salts of these new acids with "drier metals" are such vigorous drying agents that care must be taken in their preparation to prevent spontaneous combustion. Polyesters produced from the acids are so reacitve that special precautions must be taken in their production.

The low molecular weight cyclic polymers which may be reacted with alpha,beta-unsaturated-alpha,beta-dicarboxylic acids in accordance with the invention may be produced by polymerizing branch-chain 1,3-hexadienes having a straight chain of 5 carbon atoms in the presence of sulfur dioxide and of oxygen or oxygen-yielding compounds, preferably at elevated temperatures. The polymers may be produced also by the thermal decomposition of cyclic monosulfones, which may be obtained by reacting the designated 1,3-hexadienes with sulfur dioxide in the substantial absence of air or peroxides. Other methods of producing the polymers may be employed.

In producing the cyclic polymers a single hexadiene may be polymerized in the presence of sulfur dioxide, or two or more hexadienes may be polymerized in admixture with one another. It is preferred to use a mixture of 2-methyl-1,3-pentadiene and 4-methyl-1,3-pentadiene, e. g. a mixture of about 85 parts by weight of the former with about 15 parts by weight of the latter, such as may be obtained by dehydrating 2-methyl-2,4-pentanediol.

In the polymerization of the hexadienes in the presence of sulfur dioxide, molecular oxygen or an oxygen-yielding catalyst should be present. Air is a suitable source of molecular oxygen. Preferred oxygen-yielding catalysts are peroxides. The peroxides of the 1,3-hexadienes themselves are effective. Other suitable peroxides include benzoyl peroxide, tertiary butyl hydroperoxide, di(tertiary butyl) peroxide, acetyl peroxide, benzoyl acetyl peroxide, lauroyl peroxide, etc. Hydrogen peroxide, other inorganic peroxides, ozone, ozonides and the like may be employed. A single catalyst may be used or two or more catalysts may be employed simultaneously or sequentially. Very small amounts of catalyst are effective. An appreciable yield of polymer may be obtained when only traces of peroxide are present. Amounts as small as about 5 milliequivalents of active oxygen per liter of liquid hexadiene may be sufficient. Better yields and faster polymerization are obtained by the use of larger amounts of catalyst. Amounts between about 10 and about 100 milliequivalents of active oxygen per liter of liquid hexadienes are preferred, although larger amounts may be employed, the upper limit being dependent principally upon safety precautions.

The amount of sulfur dioxide employed may be varied over a wide range. It is preferred to use at least one mol of sulfur dioxide per mol of hexadiene reactant. Larger amounts, e. g. 10 mols, or smaller amounts, e. g. 0.1 mol or less, of sulfur dioxide per mol of hexadiene may be employed.

In general, in the polymerization of the designated hexadienes temperatures of 80° C. or above are required for good yields, although in some cases somewhat lower temperatures may be used. Significant amounts of polymer may, however, be produced at temperatures down to 0° C. and below. Temperatures between about 90° C. and about 120° C. are preferred. Any temperature up to the point at which decomposition or degradation of the polymer products occurs at a significant rate may be employed. Usually temperatures substantially above about 200° C. should be avoided.

The polymerization of the hexadienes may be carried out in a continuous or batchwise manner. If desired, one or more homogenizing fluids may be present. Suitable homogenizing fluids may be substances which are liquids or gases at ordinary temperatures and pressures. Normally gaseous substances may be used which are liquid or gaseous under the reaction conditions employed. Homogenizing fluids are preferably solvent diluents for both the sulfur dioxide and the hexadiene ingredients of the reaction mixture and are substantially inert under the conditions involved. Typical homogenizing agents are paraffin hydrocarbons, ethers, alcohols, aromatic hydrocarbons, "hot acid" octanes, etc. Satisfactory results may be obtained without the use of homogenizing agents.

The principal products of the polymerization of the designated hexadienes in the presence of sulfur dioxide as described are low molecular weight polymers of the hereinbefore-designated hexadienes. Yields of 90% and more may be obtained where the reaction is conducted within the preferred temperature range.

Under practical conditions of production the polymers are ordinarily contaminated with unreacted sulfur dioxide, unreacted hexadienes and cyclic monosulfone by-products. The first two contaminants mentioned may be removed by volatilization, with or without recovery. Flash distillation methods are preferred. Reduced pressures may be employed, if desired, although they are ordinarily unnecessary. Monosulfones which may be present as byproducts may be cracked as described hereinafter.

The low molecular weight polymers which may be reacted with alpha,beta-unsaturated-alpha,-beta-carboxylic acids in accordance with the invention can be produced also by the thermal cracking of one or more dimethyl-sulfolenes. These cyclic monosulfones are obtainable by reacting in liquid phase one or more of the aforedesignated hexadienes (preferably peroxide-free) with sulfur dioxide in the substantial absence of molecular oxygen and of oxygen-yielding substances, the reaction being conducted at an elevated temperature which is below that at which the monosulfones formed will decompose, temperatures in the neighborhood of about 100° C. being generally suitable. Monosulfones may be employed which have been produced by any other suitable process.

Typical suitable cyclic monosulfones are 2,2-dimethyl-3-sulfolene, 2,3-dimethyl-3-sulfolene, 2,4-dimethyl-3-sulfolene, 2,5-dimethyl-3-sulfolene, etc. and the corresponding 2-sulfolene compounds.

The term "sulfolene," as employed herein and in the appended claims, refers to an unsaturated structure containing four carbon atoms, a single olefin linkage between any two adjoining carbon atoms, and a sulfur atom in a ring, the sulfur atom of this five-membered heterocyclic unsaturated ring having two oxygen atoms attached thereto. This compound has also been called "thiacyclopentene-1,1-dioxide."

The double bond in the sulfolenes may be between any two of the adjacent carbon atoms of the ring, the generic term "sulfolene" covering both the simple, unsubstituted sulfolenes, i. e. 3-sulfolene having the structure:

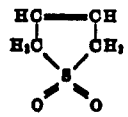

and 2-sulfolene having the structure:

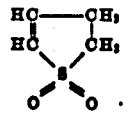

as well as the various derivatives thereof, i. e. sulfolenes in which various radicals are substituted for one or more of the hydrogen atoms of the above structures.

The numbering system of the sulfolene ring (and of the corresponding saturated sulfolane ring) is indicated below:

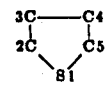

This is in accordance with the accepted system of numbering as exemplified by the compounds of this type of ring structure given on page 44 of Patterson and Capell, The Ring Index, Reinhold Publishing Corp., New York, 1940; Am. Chem. Soc. Monograph No. 84.

Thermal cracking of the dimethylsulfolenes may be effected under a wide range of conditions. A simple procedure comprises merely heating the compounds under a reflux condenser, the rate of cracking being so controlled by the temperature employed that the evolved sulfur dioxide does not sweep away the reactant or other products. Inert diluents need not be employed, although they may be present, if desired. Cracking is preferably effected in the presence of oxygen and/or peroxides, although it may be effected in their substantial absence.

Cracking in the presence of air under atmospheric pressure ordinarily begins to occur at a significant rate at about 80° C. Rapid decomposition of the dimethylsulfolenes occurs in the neighborhood of 100° C. The temperature is ordinarily raised gradually as the reaction progresses. Temperatures up to about 200° C. may be employed.

If desired, the process may be carried out in a continuous manner. Superatmospheric or reduced pressures may be employed. However, reduced pressures favor the production of the original monomers at the expense of the polymers.

The sulfur dioxide obtained as a byproduct may be discarded or recovered and recycled. In most cases a small amount of monomeric hexadienes is formed as a byproduct. These may be removed from the reaction mixture by distillation, preferably by flash distillation, or other methods.

The crude product obtained either from the designated monomeric hexadienes by polymerization in the presence of sulfur dioxide and of oxygen or oxygen-yielding substances, or by the cracking of dimethylsulfolenes is a yellow viscous liquid consisting principally of a mixture of low molecular polymers of the hexadienes. It may contain a very small amount (a trace) of sulfur-containing impurities and of unreacted hexadienes. These impurities can be removed and a stable, more uniform product obtained simply by maintaining the polymers at an elevated temperature, desirably 200° to 225° C., preferably under atmospheric or reduced pressures, in the absence of air. Heating for 2 to 4 hours is ordinarily satisfactory, although shorter or longer periods may be employed. Under some conditions at least some of the hexadiene dimer present in the crude polymer may be removed by purification in this manner. The thus purified mixture of polymers gives a negative test for sulfur and sulfur-containing compounds.

The pure or crude mixture of polymers may be separated into several fractions by distillation, preferably under reduced pressures, or by other methods such as solvent extraction, etc. Fractions boiling below about 380° C. under atmospheric pressures consist principally of dimers, trimers and tetramers (which contain cyclic structures), of the hexadienes. Approximately 52% of the polymeric substance boils above about 490° C. under atmospheric pressures and consists essentially of a seven-unit polymer (having a polymerization degree of about seven) containing in the molecule the structure

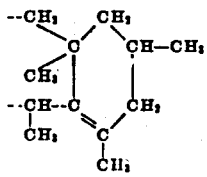

This higher molecular weight fraction is obtained as a yellow, very viscous, sticky liquid, soluble in hydrocarbons.

For most purposes the mixture of polymers need not be fractionated but may be employed as such in the process of the invention. If desired, however, any fraction or combination of fractions may be used in place of the whole mixture.

The aforesaid hexadiene polymers may be reacted with substantially any alpha,beta-unsaturated - alpha,beta - dicarboxylic acid or ester - forming derivative thereof. Relatively low molecular weight unsaturated acids having not more than about 8 carbon atoms in the molecule are preferred because of their greater reactivity. However, where the speed of reaction with the polymers is not of primary importance higher acids may be employed. It has been found that the most useful adducts in accordance with the invention are produced from acid reactants or their derivatives having at least one hydrogen atom attached directly to the alpha or beta carbon atom. In the case of compounds having a "cis" configuration with respect to the carboxyl groups, it is prefererd to use the acid anhydrides, rather than the acids themselves or other derivatives thereof. Representative examples of preferred acid anhydride reactants are maleic anhydride, monochloro maleic anhydride, citraconic anhydride, itaconic anhydride, etc. The anhydrides of many other acids may be employed. The corresponding acids of the forgoing anhydrides or other acids such as fumaric acid, acetylenedicarboxylic acid, etc., as well as the salts, esters and other ester-forming derivatives of these and like compounds, may be employed. Mixtures of two or more such unsaturated acid reactants may be employed. For technical and economic reasons maleic anhydride is the preferred reactant.

The amount of alpha,beta-unsaturated-alpha,beta-dicarboxylic acid which may be reacted with the low molecular weight cyclic hexadiene polymers may be varied over a wide range. The properties of the polymers are significantly altered and valuable products are produced where ratios as small as about one mol of alpha,beta-unsaturated-alpha,beta-dicarboxylic acid are employed for each about 120 carbon atoms of polymer, i. e. for each 20 hexadiene units combined in the polymer. Such products have improved body, faster drying and/or high oil solubility. Ratios as high as about one molecule of dicarboxylic acid to each hexadiene unit may be employed.

The reaction may be carried out in a simple manner by merely intimately mixing the cyclic polymer and the alpha,beta-unsaturated-alpha,-beta-dicarboxylic acid and heating the mixture under atmospheric pressures. If desired, one or both of the reactants may be added portion-wise to the reaction mixture at intervals during the reaction, although this procedure is ordinarily not necessary.

Under most conditions no appreciable reaction occurs at temperatures below about 175° C., although such lower temperatures may be suitable in some cases. Temperatures of between about 175° C. and about 200° C. are preferred. Higher temperatures ordinarily cause discoloration of the product, particularly where oxygen is present during the reaction. However, where light color is not of primary consideration, temperatures as high as about 300° C. may be employed. The reaction may be carried out in a continuous or discontinuous manner. Atmospheric pressures are ordinarily satisfactory, although superatmospheric pressures may be employed and reduced pressures may be advantageous under some conditions. Where the reaction is carried out under atmospheric pressures reflux conditions may be provided. Gaseous oxygen may be present, although products of somewhat improved color may be obtained by excluding oxygen, conveniently by providing the reaction mixture with a blanket of an oxygen-free fluid e. g. an oxygen-free gas such as nitrogen, carbon dioxide, etc.

The reaction may be effected in the presence or absence of homogenizing agents. Preferred homogenizing agents are substances which are inert and liquid under the conditions of the reaction and which are solvents for the cyclic polymers and acid reactants. Satisfactory results may be obtained without the use of homogenizing agents.

The time required for the reaction is dependent upon the particular reactants involved, the reaction temperature, etc. With the more reactive acid reactants such as maleic anhydride, the reaction may be substantially complete in an hour or less. In other cases much longer heating times may be required. The preferred procedure in all cases where the initial reaction mixture consists essentially only of cyclic polymers and acid anhydride reactants is to continue heating until a mixture is obtained which on cooling remains in one liquid phase.

Following the reaction the addition products of the cyclic polymers with the acid reactants may be separated from any other ingredients of the reaction mixture and further purified by any suitable known or special methods. Unreacted acid reactants may be usually removed by distillation, preferably under reduced pressures. Unreacted acids and anhydrides may be precipitated by admixture with water and removed by filtration. Further purification may be effected by solvent extraction and the like.

The addition products of the invention vary in viscosity from readily mobile liquids to hard, brittle solids, depending principally upon the nature and the proportions of the reactants. In the case of the reaction of maleic anhydride with an unfractionated mixture of low molecular weight cyclic hexadiene polymers such as may be obtained by the cracking of a dimethyl-sulfolene or by the reaction of a suitable hexadiene under the designated conditions, the influence of the relative proportions of anhydride and polymer in the adduct upon the properties thereof is shown in the following table:

| Reactants | | Adduct | | |
|---|---|---|---|---|
| Maleic Anhydride (Mols) | Hexadiene (combined in polymer) (Mols) | Viscosity | Solubility | |
| | | | In Dilute Alkali | In mineral oil [1] |
| 1 | 2 | Hard solid | Readily soluble | Slightly soluble |
| 1 | 3 | ....do..... | Soluble | Do. |
| 1 | 4 | Tacky solid | ....do..... | Soluble |
| 1 | 10 | Viscous liquid | Slightly soluble | Readily soluble |

[1] Water-white mineral oil consisting principally of saturated aliphatic hydrocarbons.

Representative analyses show that the new dibasic acid anhydrides of the invention produced from maleic anhydride correspond to the formula $((C_6H_{10})_y C_4H_2O_3)_x$, wherein $y$ represents the ratio of hexadiene units (combined in the polymers) to maleic anhydride in the adduct, and $x$ is a small positive number which is substantially equivalent to $$\frac{M}{82}$$

where $M$ represents the average molecular weight of the cyclic polymer employed as reactants. In the process of reaction of maleic anhydride with an unfractionated mixture of the low molecular weight hexadiene polymers designated hereinabove, $x$ is about 7.5.

The new anhydrides are resinous substances which are valuable per se as ingredients in coating compositions and as plasticizers and tackifiers for natural rubbers, synthetic rubbers, plastics, etc. The anhydrides may be converted to the acids, which may be similarly employed and which may be used also as corrosion inhibitors, particularly for hydrocarbon lubricating oils and greases. Conversion to the acids may be effected readily by heating a solution of the anhydride in dilute aqueous alkali for a short time, followed by acidification and recovery of the precipitated acid. Other methods will be obvious to those skilled in the art.

Esters of the acids in which some or all of the carboxyl groups are esterified with alkyl, aryl, aralkyl, etc., groups, which may be saturated or unsaturated, are valuable as plasticizers. The esters are also effective biocides, being valuable ingredients in insecticidal compositions. Examples of suitable esterifying radicals are methyl, ethyl, propyl, isopropyl, normal butyl, isobutyl, secondary butyl, tertiary butyl, normal pentyl, isopentyl, secondary pentyl, hexyl, normal octyl, isooctyl, normal decyl, isodecyl, dodecyl, tetradecyl, cetyl, stearyl, trimethyl, octadecyl, allyl, methallyl, crotyl, ethyl vinyl carbinyl, butenyl, pentenyl, hexenyl, propargyl, geranyl, oleyl, phenyl, naphthyl, anthyl, tolyl, xylyl, secondary butyl-naphthyl, dipropyl-naphthyl, benzoyl, naphthyl-butyl, phenethyl, vinyl-phenyl, crotonyl-naphthyl, methallyl-phenyl, triallyl-naphthyl, naphthylallyl, 2-phenyl-ethenyl, phenyl vinyl carbinyl, cyclopentyl, ethyl-cyclohexyl, tributyl-cyclohexyl, cyclopentenyl, cyclohexenyl and vinyl cyclohexenyl. These radicals may be substituted with other elements or groups.

The esters may be produced by any suitable known or special methods wherein the anhydride or acid or ester-forming derivative thereof is reacted with an aliphatic, aromatic or aromatic-aliphatic alcohol or ester-forming derivative thereof. Those catalysts and conditions which have been found conducive to esterification reactions in general may be employed here.

Many esters wherein the acids are esterified with unsaturated radicals may be polymerized to resinous polymers of high molecular weight, which in many cases may be rendered infusible. Some of the unsaturated esters are useful as plasticizers and tackifiers for elastomers of many kinds. Others have drying properties which render them valuable ingredients in coating and impregnating compositions. Polymerizable esters include those in which the acids are esterified with allyl-type alcohols (compounds having a double bond of aliphatic character between two carbon atoms one of which is attached directly to a saturated carbon atom which in turn is attached directly to an alcoholic hydroxyl group) as represented by allyl alcohol, methallyl alcohol, chloroallyl alcohol, crotyl alcohol, etc.; with propargyl-type alcohols (compounds having a triple bond of aliphatic character between two carbon atoms one of which is attached directly to a saturated carbon atom which in turn is attached directly to an alcoholic hydroxyl group) as represented by propargyl alcohol, etc.; or by vinyl-type alcohols (compounds having a double bond of aliphatic character between two carbon atoms one of which is attached directly to an alcoholic hydroxyl group) as represented by vinyl alcohol, propen-1-ol-2, etc.

The new acids and anhydrides of the invention are particularly adapted for esterification with polyhydric alcohols, resulting in high molecular weight polyesters of the type generally known as "alkyd resins." Many of these polyesters are actually resinous in character and are of great value in the manufacture of plastics, coating compositions and the like. In most cases the resins can be rendered infusible and relatively insoluble. Other polyesters are rubbery in character.

Representative polyhydric alcohols which may be reacted with these new acids and anhydrides are glycol, diethylene glycol, triethylene glycol, propylene glycol, butylene glycol, glycerol, diglycerol, pentaglycerol, pentaerythritol, polypentaerythritols, and polyhydric alcohols produced (actually or theoretically) by the polymerization of an unsaturated aliphatic alcohol such as allyl alcohol or by the hydrolysis of a suitable polyhydric alcohol derivative. Polyvinyl alcohol and polyallyl alcohol may be produced by the corresponding esters, acetals and the like. Instead of, or in addition to, polyhydric alcohols there may be used ester-forming derivatives thereof such as the corresponding epoxides, e.g. glycidol, epichlorhydrin, etc.

It has been found that when polyhydric alcohols such as glycerol are reacted with acids or anhydrides in accordance with the invention containing too large a proportion of carboxyl groups, i. e. addition products having too high a ratio of alpha,beta-unsaturated-alpha,beta-dicarboxylic acid to polymer, gelling occurs before polymers of high molecular weight are produced. Accordingly in the production of polyesterification products it is ordinarily best to make use of adducts containing no more than about 7% of combined dicarboxylic acid, the range of from about 4% to about 7% being preferred.

The salts of the acids of the invention with polyvalent metals have been found uniquely effective as driers and as resins in protective coating compositions. The salts may be produced by reacting the acid or any salt-forming derivative thereof, preferably the anhydride, with a suitable compound of a polyvalent metal. Salts of "drier metals" are preferred. Examples of drier metals are cobalt, manganese, cerium, lead, iron, copper, nickel, vanadium, chromium, calcium, aluminum, cadmium, zinc and tin. Of these drier metals zinc, lead, cobalt, manganese and iron display the best results. Suitable compounds of the polyvalent metals for reaction with the anhydrides of the invention include the oxides, hydroxides, inorganic salts and salts with organic acids of between one and about 20 carbon atoms, those having between 2 and 6 carbon atoms being preferred.

Various methods of reacting the addition products of the invention with the polyvalent metal compounds may be employed. If the metal salt of the addition product is insoluble the precipitate may be recovered by the usual methods. If soluble, the salt may be recovered by evaporation of the solvent. Alternatively, the reaction may be carried out by fusing the condensation product and the desired metal oxide, hydroxide or salt, preferably at a temperature within the range of from about 125° to 325° C. Another procedure for preparing the metal salts of the invention is to first dissolve the addition product in a suitable solvent, then to neutralize the product with sodium hydroxide, forming the sodium salt, and thereafter to react this salt with the salt of a lower organic acid and the desired bivalent metal.

Some of the many ways in which the invention can be carried out are illustrated by the following examples.

Example I 2,4-dimethyl-3-sulfolene, 904 parts, was placed in a glass reaction kettle under a water-cooled reflux condenser open to the atmosphere and heated slowly. When the kettle temperature reached 87° C. decomposition of the sulfone was evident. The temperature was thereafter regulated to provide for the decomposition of the sulfone at such a rate that the sulfur dioxide evolved did not sweep any of the reactant or other products out of the kettle. Evolved sulfur dioxide was discarded. At the end of three hours, when the decomposition was substantially complete, the temperature had reached 151° C. Heating was continued for an additional four hours, the temperature being raised gradually to 191° C. The residue, 494 parts, was a crude mixture of low molecular weight polymers, containing 0.006% of sulfur. The polymer was stabilized and purified by heating in an open vessel exposed to the air at 200–225° C. for four hours. No sulfur could be detected in the purified polymer.

A mixture of 250 parts of the hexadiene polymers and 299 parts of maleic anhydride was heated under a blanket of nitrogen with constant stirring for 2½ hours under atmospheric pressures. On cooling, the reaction mixture separated into two phases. The mixture was then heated for another 4 to 5 hours at 180° to 185° C., following which the reaction mixture on cooling consisted of only one phase. The reaction mixture was washed with hot water to remove unreacted maleic anhydride (precipitate) and then dried by heating at a relatively low temperature under reduced pressure. A yield of 387 parts of product was obtained. Analysis of the product showed that it had the following composition:

$$((C_6H_{10})_2C_4H_2O_3)_x$$

The product was soluble in dilute alkali and slightly soluble in light, saturated mineral oil.

Example II

The addition product produced in Example I was esterified with ethyl alcohol in the following manner. To a glass kettle attached to a separating head was charged a mixture of 156 parts of the addition product, 244 parts of benzene, 258 parts of ethyl alcohol, and 2 parts of paratoluene sulfonic acid. The mixture was refluxed for 76 hours during which time 19 parts of water were removed. The reaction mixture was then washed with water. Ethyl alcohol and benzene were removed under vacuum. The product was a viscous liquid having the approximate composition $$((C_6H_{10})_2 \cdot)CH \cdot COOC_2H_5)_2)_x$$

Example III

An addition product of maleic anhydride with cyclic polymers of hexadienes, the product having approximately the composition $$((C_6H_{10})_3C_4H_2O_3)_x$$

was produced in accordance with the procedure outlined in Example I except that larger proportions of polymer to anhydride were employed.

A mixture of 110 parts of addition product with 34 parts of diethylene glycol was placed in a glass reaction kettle, stirred at atmospheric pressures in the presence of air for one hour and 5 minutes, the temperature being gradually increased from an initial value of about 55° C. at the start of the reaction to about 256° C. The reaction product at 256° C. was a soft, dark solid having thread-forming properties. Approximately 10% of the reaction product was soluble in a mixture of equal parts by volume of toluene and amyl acetate.

Example IV

An alkyd resin was produced in accordance with the procedure outlined in Example III except that glycerol was employed instead of diethylene glycol and the final reaction temperature was 248° C. The product at room temperature was a moderately hard solid which was more than 10% soluble in a mixture of equal parts by volume of toluene and amyl acetate.

Example V

Using the procedure described in Example I, polymers were prepared having the following composition:

$$((C_6H_{10})_3 \cdot C_4H_2O_3)_x$$
$$((C_6H_{10})_5 \cdot C_4H_2O_3)_x$$

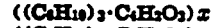

The latter product was a heavy viscous oil that could be dissolved in alcoholic potassium hydroxide and was easily soluble in light mineral oil.

Example VI

The acids from the anhydrides produced in accordance with Example I and Example V were produced by dissolving the anhydrides in dilute aqueous alkali, warming the solution for a short time, acidifying and separating the precipitated acids. The acids were washed with water and dried by heating under reduced pressures. The neutralization equivalents were determined as follows:

| Acid | Neutralization Equivalent |
|---|---|
| $((C_4H_{10})_7 \cdot C_4H_2O_3)_2$ | 146.5 |
| $((C_4H_{10})_7 \cdot C_4H_2O_3)_3$ | 306.5 |
| $((C_4H_{10})_7 \cdot C_4H_2O_3)_3$ | 401 |

Example VII 898 parts of a mixture of low molecular weight cyclic polymers of hexadienes produced in accordance with the first part of Example I was heated in a glass reaction vessel under a reflux condenser in the absence of oxygen and in the presence of nitrogen until a temperature of 193° C. was obtained. 18 parts of maleic anhydride were added. The reaction mixture was then cooled to 170° C.-175° C. and there maintained for 2½ hours. The temperature was then raised to about 180° C. and held for an additional 8 hours. The temperature was then lowered to 150° C. 4.1 parts of hydrated manganous acetate $$Mn(CH_3COO)_2 \cdot 4H_2O$$

were added. The mixture was held at 150° C. with stirring for 10 hours, following which it was filtered under reduced pressure. The product, which was the manganese salt of the adduct, was so readily oxidizable that spontaneous combustion of a portion of the filtrate occurred. The filtrate had the following analysis:

Viscosity at 25° C., centistokes _____ 32,000
Molecular weight (ebullioscopic
    in benzene) _____ 695
Manganese, per cent by weight _____ 0.1

Molecular weights referred to herein were determined according to the method described by B. J. Mair in the Bureau of Standards Journal of Research, 14, 345 (1935). The term "unsaturated" as used herein refers to carbon-to-carbon unsaturation of aliphatic character.

We claim as our invention:

1. A process comprising bringing a compound selected from the group consisting of alpha,beta-unsaturated-alpha,beta-dicarboxylic aliphatic acids and anhydrides, salts and esters of said acids into reactive engagement at a temperature between 175° and 300° C. with a low molecular weight unsaturated cyclic polymer of a branch-chain 1,3-hexadiene having a straight chain of 5 carbon atoms in the molecule.

2. A process comprising bringing maleic anhydride into reactive engagement at a temperature between 175° and 300° C. with a mixture of low molecular weight unsaturated cyclic polymers of a branch-chain 1,3-hexadiene having a straight chain of 5 carbon atoms in the molecule.

3. An addition product of a compound selected from the group consisting of alpha,beta-unsaturated-alpha,beta-dicarboxylic aliphatic acids and anhydrides, salts and esters of said acids with a low molecular weight unsaturated cyclic polymer of a branch-chain 1,3-hexadiene having a straight chain of 5 carbon atoms in the molecule.

4. An addition product of maleic anhydride with a low molecular weight unsaturated cyclic polymer of a branch-chain 1,3-hexadiene having a straight chain of 5 carbon atoms in the molecule.

5. An addition product of a compound selected from the group consisting of alpha,beta-unsaturated-alpha,beta-dicarboxylic aliphatic acids and anhydrides, salts and esters of said acids with a mixture of low molecular weight unsaturated cyclic polymers of a branch-chain 1,3-hexadiene having a straight chain of 5 carbon atoms in the molecule.

6. An addition product of a compound selected from the group consisting of alpha,beta-unsaturated-alpha,beta-dicarboxylic aliphatic acids and anhydrides, salts and esters of said acids with a mixture of low molecular weight unsaturated cyclic polymers of a branch-chain 1,3-hexadiene having a straight chain of 5 carbon atoms in the molecule, the ratio of the number of mols of hexadiene combined in the polymers to the number of mols of said selected compound in said addition product being between about one and about twenty.

7. An addition product of maleic anhydride with a mixture of low molecular weight unsaturated cyclic polymers of a branch-chain 1,3-hexadiene having a straight chain of 5 carbon atoms in the molecule.

8. An addition product of maleic anhydride with a mixture of low molecular weight unsaturated cyclic polymers of a branch-chain 1,3-hexadiene having a straight chain of 5 carbon atoms in the molecule, the ratio of the number of mols of hexadiene combined in the polymers to the number of mols of maleic anhydride in said addition product being between about one and about twenty.

9. An addition product of a compound selected from the group consisting of alpha,beta-unsaturated-alpha,beta-dicarboxylic aliphatic acids and anhydrides, salts and esters of said acids with a mixture of low molecular weight unsaturated cyclic polymers of a mixture of 2-methyl-1,3-pentadiene and 4-methyl-1,3-pentadiene.

10. An addition product of maleic anhydride with a mixture of low molecular weight unsaturated cyclic polymers of a mixture of 2-methyl-1,3-pentadiene and 4-methyl-1,3-pentadiene.

11. An addition product of a compound selected from the group consisting of alpha,beta-unsaturated-alpha,beta-dicarboxylic aliphatic acids and anhydrides, salts and esters of said acids with a mixture of low molecular weight unsaturated cyclic polymers of a mixture of 2-methyl-1,3-pentadiene and 4-methyl-1,3-pentadiene, the ratio of the number of mols of hexadiene combined in the polymers to the number of mols of said selected compound in said addition product being between about one and about twenty.

12. An addition product of maleic anhydride with a mixture of low molecular weight unsaturated cyclic polymers of a mixture of 2-methyl-1,3-pentadiene and 4-methyl-1,3-pentadiene, the ratio of the number of mols of hexadiene combined in the polymers to the number of mols of maleic anhydride being between about one and about twenty.

RUPERT C. MORRIS.
JOHN L. VAN WINKLE.

REFERENCES CITED

The following references are of record in the file of this patent:

UNITED STATES PATENTS

| Number | Name | Date |
|---|---|---|
| 2,264,354 | Alder et al. | Dec. 2, 1941 |
| 2,297,039 | Meisen | Sept. 29, 1942 |
| 2,321,750 | Humphrey | June 15, 1943 |
| 2,347,970 | Rummelsburg | May 2, 1944 |
| 2,391,226 | Clifford et al. | Dec. 18, 1945 |